(12) United States Patent
Nagino et al.

(10) Patent No.: US 11,168,202 B2
(45) Date of Patent: Nov. 9, 2021

(54) FIBER COMPOUND RESIN COMPOSITION AND METHOD OF MANUFACTURING THE SAME

(71) Applicant: Panasonic Corporation, Osaka (JP)

(72) Inventors: Toshifumi Nagino, Osaka (JP); Masashi Hamabe, Osaka (JP); Masayoshi Imanishi, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 92 days.

(21) Appl. No.: 16/254,814

(22) Filed: Jan. 23, 2019

(65) Prior Publication Data

US 2019/0284367 A1 Sep. 19, 2019

(30) Foreign Application Priority Data

Mar. 16, 2018 (JP) .............................. JP2018-048669

(51) Int. Cl.
*C08L 1/02* (2006.01)
*C08L 23/12* (2006.01)
(Continued)

(52) U.S. Cl.
CPC ................ *C08L 1/02* (2013.01); *C08J 3/201* (2013.01); *C08J 5/045* (2013.01); *C08K 7/02* (2013.01);
(Continued)

(58) Field of Classification Search
CPC ... C08K 7/02; C08L 1/02; C08L 23/12; C08L 2205/16; C08J 3/201; C08J 5/045; C08J 2323/02
See application file for complete search history.

(56) References Cited

U.S. PATENT DOCUMENTS 4,552,805 A 11/1985 Fish, Jr. et al.
6,630,231 B2 10/2003 Perez et al.
(Continued)

FOREIGN PATENT DOCUMENTS

CN 107400289 11/2017
CN 108329583 7/2018
(Continued)

OTHER PUBLICATIONS

Extended European Search Report dated Sep. 13, 2019 in corresponding European Patent Application No. 19151575.8.
(Continued)

*Primary Examiner* — Angela C Scott
(74) *Attorney, Agent, or Firm* — Wenderoth, Lind & Ponack, L.L.P.

(57) ABSTRACT

For a fiber compound resin composition, a melt-kneading process is performed together with a base resin 1, a dispersant, etc. without performing a pretreatment through wet dispersion for the purpose of defibration treatment and modification treatment of a fibrous filler 2. As a result, each fiber of the fibrous filler 2 is defibrated from end portions in a fiber length direction, while a dispersant component put in at the same time is more selectively adsorbed to defibrated portions 3 at the end portions defibrated and increased in surface area. As a result, hydrophobization of the defibrated portions 3 is promoted as compared to a non-defibrated portion 4, so that a difference in hydrophobicity is formed in the fiber length direction of the fibrous filler 2. Therefore, even when the fibrous filler 2 is added in large amount, a melt viscosity during molding may be lowered without reducing a strength of a molded article.

5 Claims, 5 Drawing Sheets (51) Int. Cl.
  *C08J 3/20* (2006.01)
  *C08J 5/04* (2006.01)
  *C08K 7/02* (2006.01)

(52) U.S. Cl.
  CPC ........... *C08L 23/12* (2013.01); *C08J 2323/02* (2013.01); *C08L 2205/16* (2013.01)

(56) References Cited

U.S. PATENT DOCUMENTS

| | | |
|---|---|---|
| 9,243,128 B2 | 1/2016 | Kumamoto et al. |
| 2009/0065975 A1* | 3/2009 | Sain ..................... B27N 1/00 264/258 |
| 2017/0334105 A1 | 11/2017 | Mikami et al. |
| 2018/0201770 A1* | 7/2018 | Hamabe ................... C08J 5/045 |
| 2018/0362405 A1 | 12/2018 | Tsujii et al. |
| 2019/0144675 A1 | 5/2019 | Hamabe et al. |
| 2020/0062940 A1* | 2/2020 | Hamabe ................... C08K 7/02 |
| 2020/0283607 A1* | 9/2020 | Hamabe ................... C08J 5/045 |

FOREIGN PATENT DOCUMENTS

| | | |
|---|---|---|
| CN | 109762244 | 5/2019 |
| EP | 3 351 587 | 7/2018 |
| JP | 2000-103915 | 4/2000 |
| WO | 2007/056839 | 5/2007 |
| WO | 2017/094812 | 6/2017 |

OTHER PUBLICATIONS

Chinese Office Action and Chinese Search Report dated Jun. 2, 2021 in Chinese Patent Application No. 201910061990.2, with partial English translation of Chinese Office Action and full English translation of Chinese Search Report.

* cited by examiner

FIBER COMPOUND RESIN COMPOSITION AND METHOD OF MANUFACTURING THE SAME

CROSS-REFERENCE TO RELATED APPLICATIONS

This application claims priority of Japanese Patent Application No. 2018-48669 filed on Mar. 16, 2018, the contents of which is incorporated herein by reference.

BACKGROUND OF THE INVENTION

1. Field of the Invention

The present disclosure relates to a fiber compound resin composition containing a fibrous filler and a method of manufacturing the same.

2. Description of the Related Art

So-called "commodity plastics" such as polyethylene (PE), polypropylene (PP), polystyrene (PS), and polyvinyl chloride (PVC) etc. are not only very inexpensive but also easily molded and have light weight several times smaller as compared to metal or ceramics. Therefore, commodity plastics are widely used as materials for various living goods such as bags, various packages, various containers, and sheets, as industrial parts such as automobile parts and electric parts, and as materials for daily commodities, miscellaneous goods etc.

However, the commodity plastics have disadvantages such as insufficient mechanical strength. Therefore, the commodity plastics do not have sufficient characteristics required for materials used for mechanical products such as automobiles and various industrial products comprising electric/electronic/information products and are currently limited in range of application.

In contrast, "engineering plastics" are excellent in mechanical characteristics and are used for mechanical products such as automobiles and various industrial products comprising electric/electronic/information products. However, the engineering plastics have problems such as being expensive, difficulty in monomer recycling, and high environmental burden.

Therefore, a demand exists for significantly improving material characteristics (such as mechanical strength) of commodity plastics. In a known technique, natural fibers, glass fibers, carbon fibers, etc. serving as a fibrous filler are dispersed in resins of commodity plastics to improve the mechanical strength of the commodity plastics. Among them, an organic fibrous filler such as cellulose is inexpensive and excellent in environmental property at the time of disposal and is therefore attracting attention as a reinforcing fiber.

However, when a fibrous filler is compounded to improve the mechanical strength of commodity plastics, an increase in melt viscosity during molding prevents precise molding. Therefore, each company is conducting a study on lowering the melt viscosity. For example, in Japanese Laid-Open Patent Publication No. 2000-103915, a melt viscosity of a fiber compound resin composition is lowered by adding a low melting point resin material.

However, in Japanese Laid-Open Patent Publication No. 2000-103915, since a resin material having a molecular weight lower than a base resin is compounded, the melt viscosity during molding may be lowered; however, a problem of reduced strength of a molded article occurs due to an influence of the resin material having a low molecular weight.

SUMMARY

A fiber compound resin composition of the present disclosure solves the conventional problem, and provides a reduction in melt viscosity of a resin composition during molding without reducing a strength of a molded article.

One non-limiting and exemplary embodiment provides a fiber compound resin composition of the present disclosure is made of a fiber compound resin containing a fibrous filler in a base resin, and in the fiber compound resin, each fiber of the fibrous filler has defibrated portions formed at end portions in a fiber length direction thereof and having hydrophobicity higher than a non-defibrated portion in a central portion of the fiber of the fibrous filler.

According to the fiber compound resin composition of the present disclosure, in a range of the content of the fibrous filler from 10 mass % or higher to 80 mass % or lower when a total amount of the base resin and the fibrous filler is 100 mass %, a value of a melt mass flow rate of the resin composition defined by JIS K 7210 (corresponding standards: ISO 1133-1, 1133-2) is 50% or higher and less than 100% relative to a value of the melt mass flow rate of the base resin.

According to the fiber compound resin composition of the present disclosure, preferably, the highly hydrophobic defibrated portions of the defibrated filler have a median fiber diameter of 0.1 μm or higher and 2 μm or lower, and the non-defibrated portion of the fibrous filler has a median fiber diameter of 5 μm or higher and 30 μm or lower.

According to the fiber compound resin composition of the present disclosure, the fibrous filler is preferably natural fibers of cellulose.

According to the fiber compound resin composition of the present disclosure, the base resin is preferably an olefin resin.

In a method of manufacturing a fiber compound resin composition of the present disclosure, a fibrous filler is subjected to a melt-kneading process together with a base resin and a dispersant improving hydrophobicity, so that each fiber of the fibrous filler is defibrated from end portions in a fiber length direction, while the dispersant improving hydrophobicity is more selectively adsorbed to the end portions defibrated and expanded in surface area.

As a result, hydrophobization is promoted in the end portions in the fiber length direction of the fibrous filler as compared to the other portion, i.e., the non-defibrated portion, and therefore, a difference in hydrophobicity may be formed along the fiber length direction of the fibrous filler.

According to the fiber compound resin composition of the present disclosure, the fibrous filler comprising fibers with the highly hydrophobic defibrated portions formed in end portions in the fiber length direction may be compounded with the base resin, so that the melt viscosity during molding may be reduced without lowering the strength of the molded part even when the fibrous filler is added in large amount.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE DRAWINGS

The present disclosure will become readily understood from the following description of non-limiting and exemplary embodiments thereof made with reference to the accompanying drawings, in which like parts are designated by like reference numeral and in which.

DETAILED DESCRIPTION

A fiber compound resin composition and a method of manufacturing the same according to an embodiment of the present disclosure will now be described with reference to the drawings.

Figure 1:
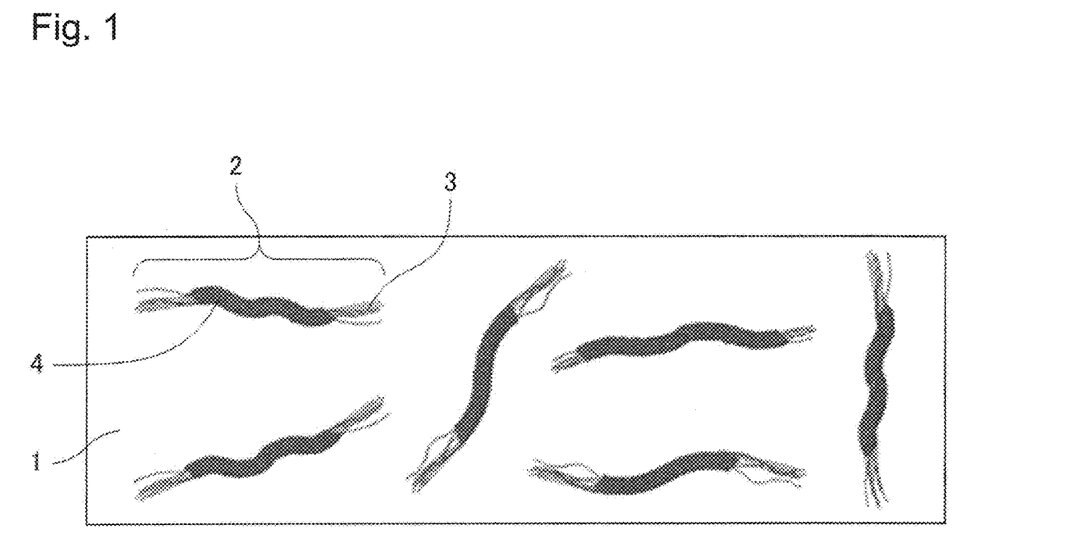
FIG. 1 is a diagram showing a structure of a fiber compound resin composition according to an embodiment of the present disclosure.

The fiber compound resin composition of the embodiment of the present disclosure is obtained from a melt-kneaded material containing a base resin, a fibrous filler, and a dispersant. In this fiber compound resin composition, as shown in FIG. 1, a fibrous filler 2 is dispersed in a base resin 1.

The base resin 1 must be a thermoplastic resin so as to ensure favorable moldability. Examples of the thermoplastic resin comprise olefin resins (comprising cyclic olefin resins), styrene resins, (meth)acrylic resins, organic acid vinyl ester resins or derivatives thereof, vinyl ether resins, halogen-containing resins, polycarbonate resins, polyester resins, polyamide resins, thermoplastic polyurethane resins, polysulfone resins (polyethersulfone, polysulfone, etc.), polyphenylene ether resins (polymers of 2,6-xylenol etc.), cellulose derivatives (cellulose esters, cellulose carbamates, cellulose ethers, etc.), silicone resins (polydimethylsiloxane, polymethylphenylsiloxane, etc.), rubbers or elastomers (diene rubbers such as polybutadiene and polyisoprene, styrene-butadiene copolymers, acrylonitrile-butadiene copolymer, acrylic rubber, urethane rubber, silicone rubber, etc.). The above resins may be used alone or in combination of two or more. The base resin 1 is not limited to the above materials as long as the resin is thermoplastic.

Among these thermoplastic resins, the base resin 1 is preferably an olefin resin having a relatively low melting point. Examples of the olefin resin comprise homopolymers of olefin monomers, copolymers of olefin monomers, and copolymers of olefin monomers and other copolymerizable monomers. Examples of the olefin monomers comprise chain olefins (α-C2-20 olefins such as ethylene, propylene, 1-butene, isobutene, 1-pentene, 4-methyl-1-pentene, and 1-octene etc.) and cyclic olefins. These olefin monomers may be used alone or in combination of two or more. Among the above olefin monomers, chain olefins such as ethylene and propylene are preferable. Examples of other copolymerizable monomers comprise: fatty acid vinyl esters such as vinyl acetate and vinyl propionate; (meth)acrylic monomers such as (meth)acrylic acid, alkyl (meth)acrylate, and glycidyl (meth)acrylate; unsaturated dicarboxylic acids or anhydrides thereof such as maleic acid, fumaric acid, and maleic anhydride; vinyl esters of carboxylic acid (e.g., vinyl acetate, vinyl propionate); cyclic olefins such as norbornene and cyclopentadiene; and dienes such as butadiene and isoprene. These copolymerizable monomers may be used alone or in combination of two or more. Specific examples of the olefin resin comprise polyethylene (low-density, medium-density, high-density, or linear low-density polyethylene), polypropylene, ethylene-propylene copolymers, and copolymers of chain olefins (particularly α-C2-4 olefins) such as ternary copolymers such as ethylene-propylene-butene-1.

The fibrous filler 2 will be described. Each fiber of the fibrous filler 2 has defibrated portions 3 formed at both ends in the length direction and the other portion that is not defibrated, i.e., a non-defibrated portion 4.

The fibrous filler 2 is used in the resin composition of the present disclosure for the main purpose of improvement in mechanical characteristics and improvement in dimensional stability through a reduction in linear expansion coefficient. For this purpose, the fibrous filler 2 preferably has a higher elastic modulus than the base resin 1. Specific examples of the fibrous filler 2 comprise: natural fibers such as pulp, cellulose nanofibers, lignocellulose, lignocellulose nanofibers, cotton, silk, wool, or hemp; regenerated fibers such as jute fibers, rayon, or cupra; semisynthetic fibers such as acetate and promix; synthetic fibers such as polyester, polyacrylonitrile, polyamide, aramid, and polyolefin; carbon fibers; carbon nanotubes; and modified fibers thereof chemically modified on surfaces and ends. Among them, natural fibers of celluloses are particularly preferable from the viewpoints of availability, high elastic modulus, low linear expansion coefficient, and environmental properties.

The content of the fibrous filler 2 is preferably 10 mass % or higher and 80 mass % or lower when the total amount of the base resin and the fibrous filler is 100 mass %. This is because although an improvement in mechanical strength is obviously be expected by adding the fibrous filler 2; however, an amount smaller than this range is likely to cause a problem that the mechanical strength may not sufficiently be increased, and conversely, an amount larger than this range is likely to cause a problem that dispersibility of the fibrous filler is extremely reduced.

The dispersant will be described.

To the fibrous filler 2, the dispersant is added for the purpose of improving the dispersibility in the base resin 1, the adhesiveness to the base resin 1, and the hydrophobicity in the fiber compound resin composition. Additionally, in the present disclosure, a higher hydrophobicity is imparted by the dispersant to the defibrated portions 3 of the fibrous filler 2 as compared to the non-defibrated portion 4.

Examples of the dispersant may comprise: various titanate-based coupling agents; silane coupling agents; modified polyolefins grafted with unsaturated carboxylic acid, maleic acid, maleic anhydride; and dispersants surface-treated with fatty acid, fatty acid metal salt, fatty acid ester etc. The dispersant may be surface treated with a thermosetting or thermoplastic polymer component without problem.

The content of the dispersant in the fiber compound resin composition is preferably 0.01 mass % or higher and 20 mass % or lower, more preferably 0.1 mass % or higher and 10 mass % or lower, further preferably 0.5 mass % or higher and 5 mass % or lower, relative to the amount of the base resin 1. The content of the dispersant less than 0.01 mass % causes poor dispersion. On the other hand, the content of the dispersant exceeding 20 mass % reduces strength of a molded article manufactured by using the fiber compound resin composition. The dispersant is appropriately selected in terms of a type and an amount of use depending on a combination of the base resin 1 and the fibrous filler 2.

A method or manufacturing a fiber compound resin composition will be described.

Figure 2:
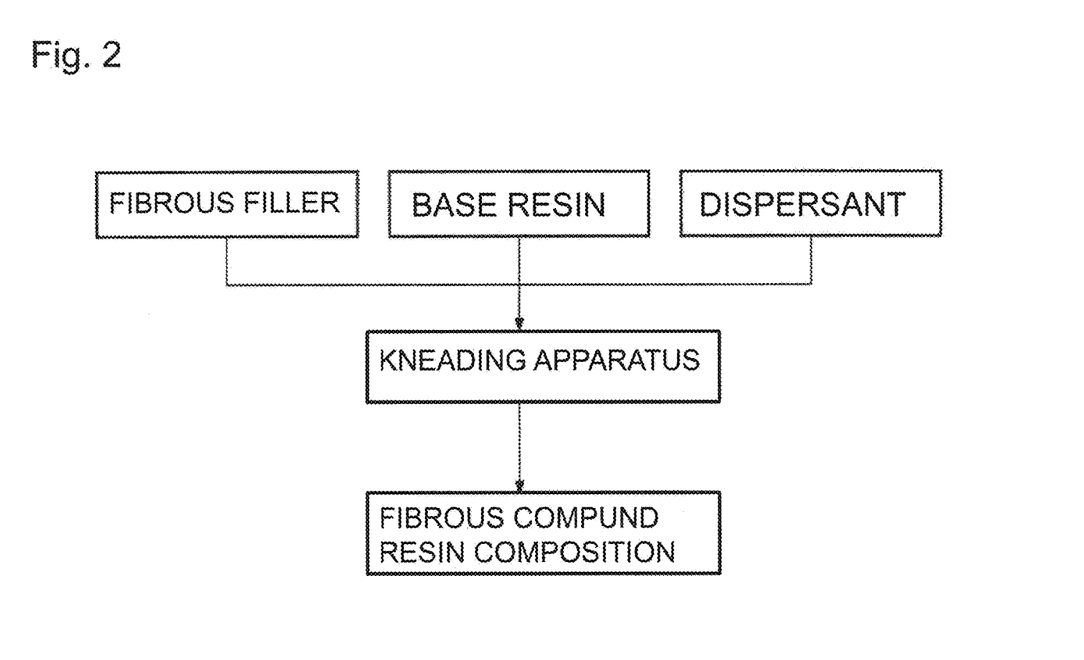
FIG. 2 is a flow chart for explaining a manufacturing process of the fiber compound resin composition according to the embodiment of the present disclosure.

FIG. 2 is a flow chart illustrating a manufacturing process of the fiber compound resin composition according to an embodiment of the present disclosure.

First, a base resin 1, a fibrous filler 2, and a dispersant having a hydrophobicity improving function are prepared, and the base resin 1, the fibrous filler 2, and the dispersant improving the hydrophobicity are put into a melt-kneading apparatus and melt-kneaded in the melt-kneading apparatus. As a result, the base resin 1 is melted, and the fibrous filler 2 and the dispersant are dispersed in the molten base resin 1. At the same time, a shearing action of the apparatus promotes defibration of agglomerates of the fibrous filler 2, so that the fibrous filler 2 may finely be dispersed in the base resin 1.

The fibrous filler 2 conventionally used is preliminarily defibrated into fibers by pretreatment such as wet dispersion. However, when the fibrous filler 2 is preliminarily defibrated in a solvent used for wet dispersion, defibration more easily occurs as compared to the defibration in the molten base resin 1, which makes it difficult to defibrate only the end portions, so that the fibrous filler 2 is entirely defibrated. Therefore, a difference in hydrophobicity cannot be formed along the fiber length direction of the fibrous filler 2 as in the present disclosure described later. Additionally, the number of steps is increased by combining the pretreatment, causing a problem such as deterioration of productivity.

In contrast, in the manufacturing process of the fiber compound resin composition according to this embodiment, the fibrous filler 2 is subjected to a melt-kneading process together with the base resin 1 and the dispersant without performing pretreatment through wet dispersion for the purpose of a defibrating treatment and a modifying treatment of the fibrous filler 2. In such a method, since the fibrous filler 2 is not subjected to a wet dispersion treatment in a preliminary stage, each fiber of the fibrous filler 2 is defibrated from the end portions in the fiber length direction, while the component of the dispersant put in at the same time for improving the hydrophobicity is more selectively adsorbed to the defibrated portions 3 at the end portions of the fiber defibrated and increased in surface area. As a result, hydrophobization of the defibrated portions 3 is promoted as compared to the non-defibrated portion 4, so that a difference in hydrophobicity may be formed along the fiber length direction of the fibrous filler 2. Additionally, the number of steps is smaller, and the productivity may be improved.

A hydrophobic state of the fibrous filler 2 is confirmed as follows. From results of experiments by the present inventor, although a gap is formed between the non-defibrated portion 4 and the hydrophobic base resin 1 in the dispersed state in the base resin 1, no gap is observed between the defibrated portion 3 and the hydrophobic base resin 1 so that adhesiveness is improved, and therefore, it is confirmed that the hydrophobization of the defibrated portion 3 is promoted as compared to the non-defibrated portion 4.

Figure 3:
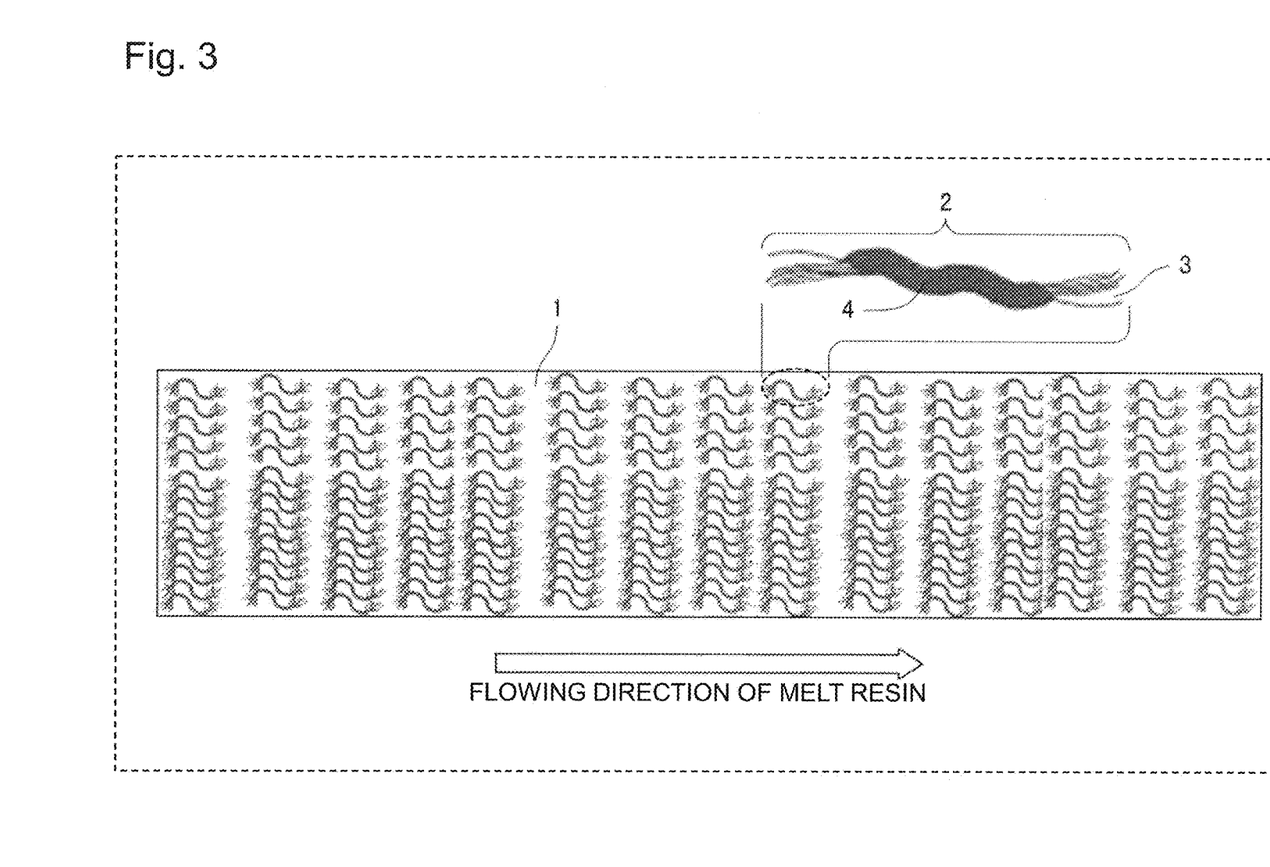
FIG. 3 is a schematic view showing a melt flow state during molding using the fiber compound resin composition according to the embodiment of the present disclosure.
Figure 4:
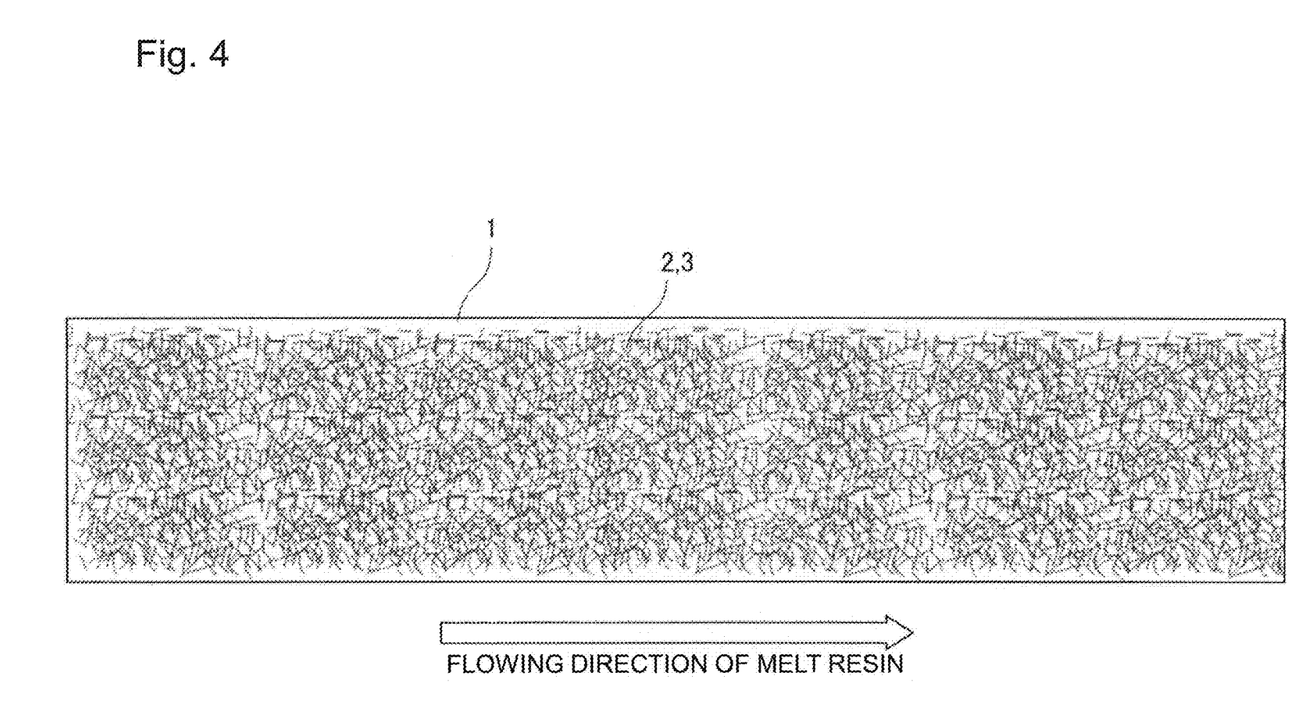
FIG. 4 is a schematic view showing another melt flow state during molding.
Figure 5:
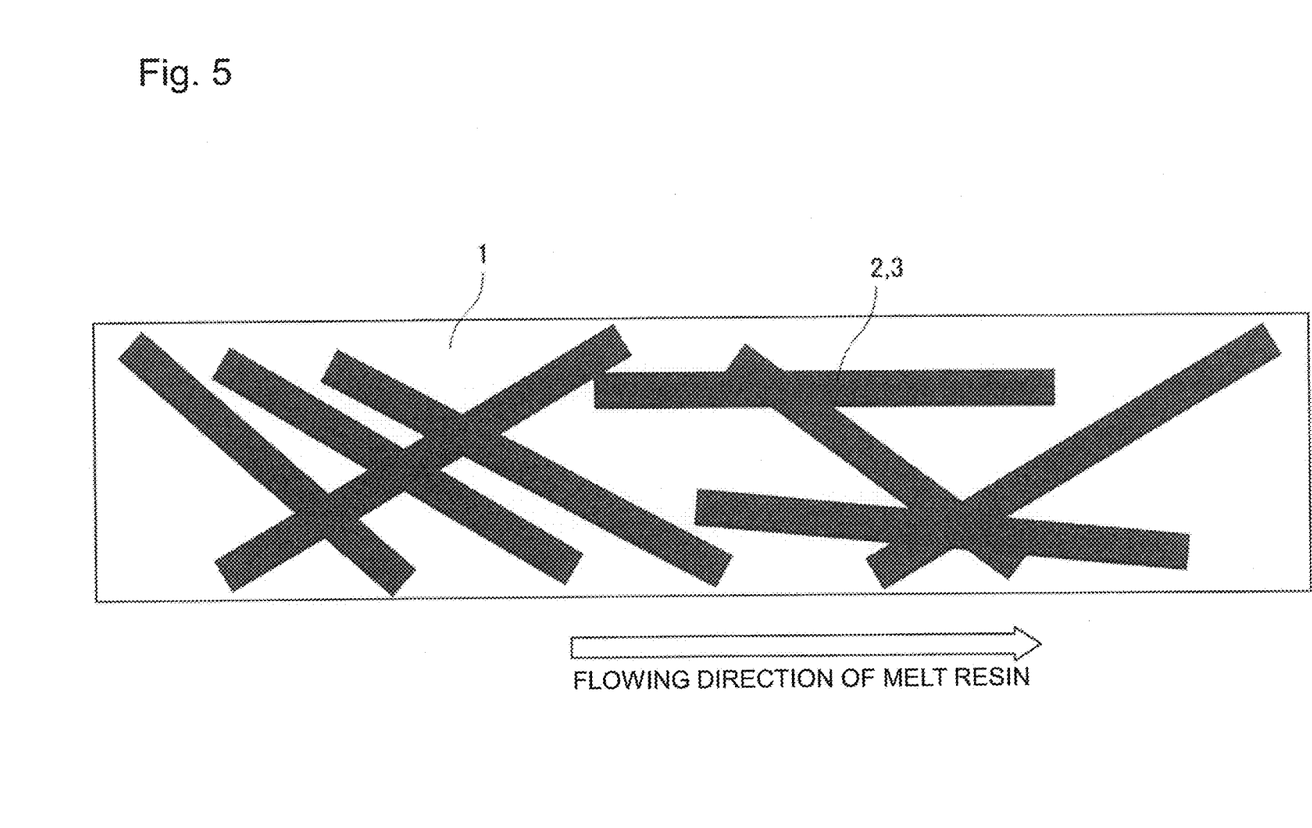
FIG. 5 is a schematic view showing a further melt flow state during molding.

FIGS. 3, 4, and 5 are schematic cross-sectional views showing a difference in melt flow state during molding due to differences in fiber shape and hydrophobicity of the fibrous filler 2.

FIG. 3 shows a melt flow state when the resin composition of the embodiment of the present disclosure is used. In this case, each fiber of the fibrous filler 2 has the highly hydrophobic defibrated portions 3 formed in the end portions thereof and the non-defibrated portion 4 formed in the other portion less hydrophobic than the defibrated portion 3. Specifically, the fibrous filler 2 has a difference in hydrophobicity formed in the fiber length direction and is therefore more easily straightened in a flow direction of the hydrophobic base resin 1. Due to this effect, the melt viscosity during molding may be lowered even when the fibrous filler 2 is added in large amount.

In FIG. 4, the fibrous filler 2 is strongly, i.e., excessively, defibrated so that only the defibrated portions 3 are dispersed in the form of short fibers without the clear presence of non-defibrated portions, which makes it unable to form a difference in hydrophobicity in the fiber length direction of the fibrous filler 2. Furthermore, the total surface area of the fibrous filler 2 is very large. Therefore, when the fibrous filler 2 is added in large amount, the melt viscosity during molding becomes high and prevents precise molding.

In FIG. 5, the fibrous filler 2 is not sufficiently defibrated, and the non-defibrated portion 4 has a thick fiber diameter, so that the fibrous filler 2 is dispersed in a state in which the defibrated portions 3 are substantially not present. Therefore, a difference in hydrophobicity in the fiber length direction of the fibrous filler 2 is not sufficiently be formed. As a result, straightening is hardly achieved in the flowing direction of the hydrophobic base resin 1, and the fibers easily entangle each other to form agglomerates and therefore hinders flowability. Due to this influence, when the fibrous filler 2 is added in large amount, the melt viscosity during molding becomes high and prevents precise molding.

Regarding a form of the optimum fibrous filler 2, it is confirmed from results of experiments and simulations by the present inventor that a median fiber diameter of the defibrated portions 3 is 0.1 µm or higher and 2 µm or lower and a median fiber diameter of the non-defibrated portion is 5 µm or higher and 30 µm or lower.

The fiber compound resin extruded from the melt-kneading apparatus is fabricated into a pellet shape through a cutting step by a pelletizer etc. Examples of a method of pelletization comprise an air hot-cut method, an underwater hot-cut method, a strand-cut method as methods performed immediately after resin melting. Alternatively, a pulverization method etc. may be performed for pulverization or cutting after once a molded article or a sheet is molded.

According to the present disclosure, as described above, each fiber of the compounded fibrous filler 2 is defibrated from the end portions in the fiber length direction, while the dispersant component put in at the same time is more selectively adsorbed to the defibrated portions 3 at the end portions of the fiber defibrated and increased in surface area. As a result, hydrophobization of the defibrated portions 3 is promoted as compared to the non-defibrated portion 4, so that the fibrous filler 2 has a structure in which a difference in hydrophobicity is formed in the fiber length direction. Therefore, even when the fibrous filler 2 is added in large amount, the melt viscosity during molding may be lowered, which makes it possible to obtain a fiber compound resin composition enhanced in both the high rigidity due to addition of the fibrous filler 2 and the flowability to a metal mold etc. during melt molding.

Regarding the flowability, specifically, in a range of the content of the fibrous filler from 10 mass % or higher to 80 mass % or lower when the total amount of the base resin and the fibrous filler is 100 mass %, a value of the melt mass flow rate of the resin composition defined by JIS K 7210 (corresponding standards: ISO 1133-1, 1133-2) may be set to 50% or higher and less than 100% relative to a value of the melt mass flow rate of the base resin. Specifically, while a decrease in the value of the melt mass flow rate means that a corresponding increase in viscosity deteriorates flowability, the present disclosure may achieve a 50% or higher value relative to a value of the melt mass flow rate value of the base resin as described above. Therefore, a deterioration of the flowability may be suppressed within a sufficiently allowable range.

EXAMPLES

Examples and Comparative Examples based on experiments conducted by the present inventors will hereinafter be described.

Example 1

Pulp-dispersed polypropylene pellets were produced by the following manufacturing method, and various evaluations were performed by using the pellets.

Specifically, a fibrous filler and a base resin were weighed to satisfy conditions that a content of cotton-like softwood pulp (trade name: NBKP Celgar, manufactured by Mitsubishi Paper Mills Limited) serving as the fibrous filler accounts for 0, 10, 15, 20, 50, 80, 85 and 90 mass % relative to polypropylene (trade name: J108M, manufactured by Prime Polymer Co., Ltd.) serving as the base resin based on the total amount of the base resin and the fibrous filler defined as 100 mass %. In each of these conditions, maleic anhydride (trade name: Yumex, manufactured by Mitsubishi Kasei Kogyo) serving as a dispersant improving hydrophobicity was weighed and dry-blended in an amount of 5 parts by mass based on 100 parts by mass of the polypropylene serving as the base resin. For example, in the condition that the cotton-like softwood pulp accounts for 15 mass %, the polypropylene and the maleic anhydride were weighed in amounts of 85 mass % and 4.25 mass %, respectively. Subsequently, the mixture was melt-kneaded and dispersed in a twin-screw kneader (S-1 KRC kneader manufactured by Kurimoto, Ltd., screw diameter ø 25 mm, L/D=10.2).

In this case, a shearing force may be varied by changing a screw configuration of the twin-screw kneader, and in Example 1, a medium shearing type specification was used with a kneading part temperature of 180° C. and an extrusion speed of 0.5 kg/h. Additionally, a melt-kneading dispersion process under the conditions was repeated ten times to perform the process for a long time. The resin molten material was hot-cut to fabricate the pulp-dispersed polypropylene pellets. The obtained pulp-dispersed polypropylene pellets were evaluated by the following method.

(Median Fiber Diameter of Non-Defibrated Portions without Defibration, Median Fiber Diameter of Defibrated Portions)

The pulp-dispersed polypropylene pellets fabricated under the conditions described above were immersed in a xylene solvent to dissolve the polypropylene, and remaining pulp fibers were subjected to SEM observation. Specifically, about 100 representative fibers were measured by using SEM (scanning electron microscope Phenom G2pro manufactured by PHENOM-World). As a result of calculation of a median fiber diameter from a fiber diameter measurement result, the median fiber diameter of the non-defibrated portions was 5.2 µm or higher and 9.8 µm or lower, the defibrated portions were observed at end portions in the fiber length direction, and the median fiber diameter of the defibrated portions was 0.3 µm or higher and 0.7 µm or lower.

(Melt Mass Flow Rate)

A melt mass flow rate (MFR) was measured in conformity to JIS K 7210 (corresponding standards: ISO 1133-1, 1133-2) by using the pulp-dispersed polypropylene pellets fabricated under the conditions described above. Since the base resin was polypropylene, the measurement was performed under the conditions of test temperature=230° C. and test load=2.16 kg (JIS K 6921-1: corresponding to ISO 19069-1: 2015).

Example 2

A change was made from Example 1 by shortening the melt-kneading dispersion process to repeating 3 times. The pulp-dispersed polypropylene pellets were fabricated as in Example 1 in terms of the other conditions. Evaluation was performed as in Example 1.

Comparative Example 1

A change was made from Example 1 by preliminarily applying a wet defibration treatment to the cotton-like softwood pulp and thereby using pulp fibers advanced in defibration of fibers. The pulp-dispersed polypropylene pellets were fabricated as in Example 1 in terms of the other conditions. Evaluation was performed as in Example 1.

Comparative Example 2

As compared to Example 1, the screw configuration was changed to a high shear type. The pulp-dispersed polypropylene pellets were fabricated as in Example 1 in terms of the other conditions. Evaluation was performed as in Example 1.

Comparative Example 3

The high-shear type screw configuration was used as in Comparative Example 2, and the melt-kneading dispersion in this screw configuration was shortened to three-time process. The pulp-dispersed polypropylene pellets were fabricated as in Example 1 in terms of the other conditions. Evaluation was performed as in Example 1.

Comparative Example 4

The high-shear type screw configuration was used as in Comparative Example 2, and the melt-kneading dispersion in this screw configuration was shortened to one-time process. The pulp-dispersed polypropylene pellets were fabricated as in Example 1 in terms of the other conditions. Evaluation was performed as in Example 1.

Comparative Example 5

As compared to Example 1, the screw configuration was changed to a low shear type. The pulp-dispersed polypropylene pellets were fabricated as in Example 1 in terms of the other conditions. Evaluation was performed as in Example 1.

Figure 6:
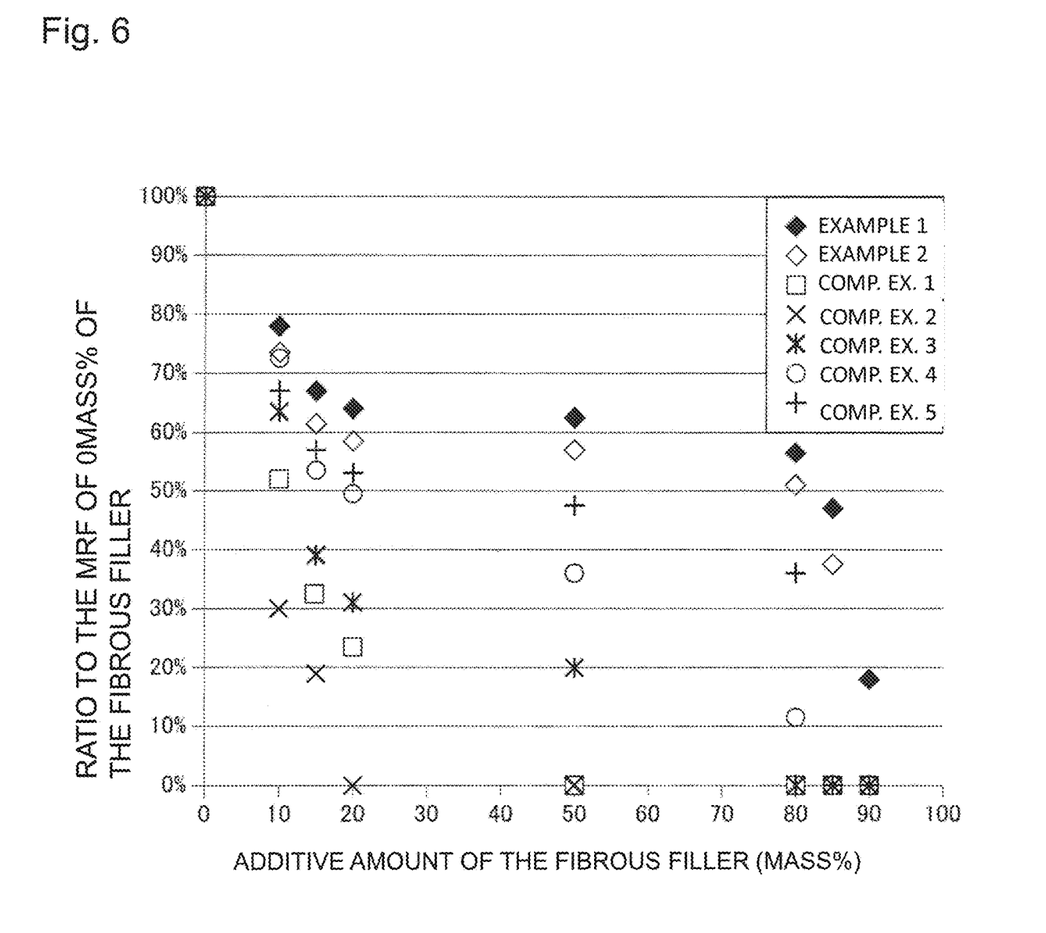
FIG. 6 is a diagram showing a correlation of MFR to an additive amount of a fibrous filler in Examples 1 and 2 and Comparative Examples 1 to 5.

The evaluation results of Examples 1 and 2 and Comparative Examples 1 to 5 are shown in Table 1. FIG. 6 shows a correlation of MFR to an additive amount of the fibrous filler in Examples 1 and 2 and Comparative Examples 1 to 5 based on the measurement results.

TABLE 1

| | fibrous filler conditions | | MFR (g/10 minutes) * test temperature = 230° C., test load = 2.16 kg (percentage of base resin to MFR) fibrous filler additive amount (mass %) | | | | | | | |
|---|---|---|---|---|---|---|---|---|---|---|
| | wet defibration treatment | median fiber diameter of portions without defibration | median fiber diameter of defibrated portions | 0 | 10 | 15 | 20 | 50 | 80 | 85 | 90 |
| Example 1 | none | 5.2 to 9.8 μm | 0.3 to 0.7 μm | 28.3 | 22.1 (78%) | 18.9 (67%) | 18.1 (64%) | 17.6 (62%) | 16.0 (57%) | 13.3 (47%) | 5.0 (18%) |
| Example 2 | none | 20.2 to 28.1 μm | 1.5 to 1.8 μm | 28.1 | 20.5 (73%) | 17.2 (61%) | 16.5 (59%) | 16.0 (57%) | 14.3 (51%) | 10.5 (37%) | 0.0 (0%) |
| Comparative Example 1 | performed | — | 0.2 to 0.6 μm | 28.6 | 14.8 (52%) | 9.2 (32%) | 6.5 (23%) | 0.0 (0%) | 0.0 (0%) | 0.0 (0%) | 0.0 (0%) |
| Comparative Example 2 | none | 0.9 to 1.3 μm | less than 0.1 μm | 27.8 | 8.3 (30%) | 5.2 (19%) | 0.0 (0%) | 0.0 (0%) | 0.0 (0%) | 0.0 (0%) | 0.0 (0%) |
| Comparative Example 3 | none | 2.2 to 1.1 μm | 0.5 to 0.8 μm | 28.9 | 18.3 (63%) | 11.2 (39%) | 8.9 (31%) | 5.8 (20%) | 0.0 (0%) | 0.0 (0%) | 0.0 (0%) |
| Comparative Example 4 | none | 35.2 to 38.4 μm | 1.0 to 1.5 μm | 28.5 | 20.5 (72%) | 15.2 (53%) | 13.9 (49%) | 10.2 (36%) | 3.2 (11%) | 0.0 (0%) | 0.0 (0%) |
| Comparative Example 5 | none | 20.5 to 25.2 μm | 2.2 to 3.0 μm | 28.0 | 18.7 (67%) | 16.0 (57%) | 14.8 (53%) | 13.2 (47%) | 10.1 (36%) | 0.0 (0%) | 0.0 (0%) |

As is apparent from Table 1 and FIG. 6, in Examples 1 and 2 in which the fibrous filler was added to achieve the defibrated state with the median fiber diameter of the non-defibrated portion of 5 μm or higher and 30 μm or lower and the median fiber diameter of the defibrated portion of 0.1 μm or higher and 2 μm or lower, each fiber of the fibrous filler was defibrated from the end portions in the fiber length direction, while the dispersant component put in at the same time was more selectively adsorbed to the defibrated portions at the end portions defibrated and increased in surface area, and therefore, hydrophobization was promoted as compared to the non-defibrated portion, so that a difference in hydrophobicity was formed in the fiber length direction of the fibrous filler. Consequently, it was confirmed that due to the effect of facilitating straightening in the flow direction of the hydrophobic base resin, a value of the MFR of the fibrous compound resin composition was 50% or higher and less than 100% as compared to a value of the MFR of the base resin when the content of the fibrous filler is in a range of 10 mass % or higher to 80 mass % or lower relative to the amount of the base resin. In other words, it was confirmed that the flowability for normal molding conditions was ensured.

In contrast, in Comparative Example 1 using the pulp fiber advanced in defibration of fibers due to preliminary application of the wet defibration treatment to the cotton-like softwood pulp serving as the fibrous filler, the fibrous filler tended to be extremely defibrated in the molten resin, which makes it difficult to defibrate only the end portions, so that the fibrous filler was in an entirely defibrated state. Since this made it impossible to form a difference in hydrophobicity in the fiber length direction of the fibrous filler, and additionally, the fibrous filler had a large surface area, the MFR significantly decreased when the content of the fibrous filler was in a range of 15 mass % or higher relative to the amount of the base resin, and consequently, the flowability for normal molding conditions was not ensured.

In Comparative Example 2 in which the screw configuration was changed to the high shear type, application of excessive shear reduced the median fiber diameter of the defibrated portions to less than 0.1 μm while the non-defibrated portion without defibration also had an excessively thin median fiber diameter of 0.9 μm or higher and 1.3 μm or lower, resulting in an excessively small difference in hydrophobicity in the fiber length direction, so that the effect of the present disclosure was produced. Specifically, partly because the fibrous filler had a large surface area, the MFR significantly decreased when the content of the fibrous filler was in a range of 10 mass % or higher relative to the amount of the base resin, and consequently, the flowability for normal molding conditions was not ensured.

In Comparative Example 3 in which the screw configuration was changed to the high shear type as in Comparative Example 2 with the number of times of the melt-kneading dispersion process reduced to 3 times for changing to a short-time process, the defibrated portion was defibrated to a thin state in which the median fiber diameter is 0.5 μm or higher and 0.8 μm or lower, so that although a difference in hydrophobicity in the fiber length direction of the fibrous filler was formed to some extent, a degree of the difference required for producing the effect of the present disclosure was not reached. Moreover, partly because the non-defibrated portion was excessively thinly defibrated to the median fiber diameter of 2.2 μm or higher and 4.1 μm or lower, the surface area of the fibrous filler becomes too large, and due to this influence, the MFR significantly decreased when the content of the fibrous filler was in a range of 15 mass % or higher relative to the amount of the base resin, and consequently, the flowability for normal molding conditions was not ensured.

In Comparative Example 4 in which the number of times of the melt-kneading dispersion process is reduced to one time from Comparative Example 3 for changing to a short-time process, although the defibrated portion was sufficiently defibrated to the median fiber diameter of 10 μm or higher and 1.5 μm or lower, the non-defibrated portions without defibration (comprising insufficiently defibrated portions) have a thick median fiber diameter of 35.2 μm or higher and 38.4 μm or lower, so that although a difference in hydrophobicity in the fiber length direction of the fibrous filler was formed to some extent, a degree of the difference required for producing the effect of the present disclosure was not reached. Moreover, since the fibers easily entangle each other to form agglomerates and therefore hinders flowability, the MFR significantly decreased when the content of the fibrous filler was in a range of 20 mass % or higher relative to the amount of the base resin, and consequently, the flowability for normal molding conditions was not ensured.

In Comparative Example 5 in which the screw configuration was changed to the low shear type, the non-defibrated portion was made thin to the median fiber diameter of 20.5 µm or higher and 25.2 µm or lower; however, due to low shear, the defibrated portions were insufficiently defibrated to the median fiber diameter of 2.2 µm or higher and 3.0 µm or lower, and therefore, a difference in hydrophobicity in the fiber length direction of the fibrous filler was not sufficiently formed, so that the effect of the present disclosure was not produced. Moreover, since the straightening was hardly achieved in the flowing direction of the hydrophobic base resin, and the fibers easily entangled each other to form agglomerates and therefore hindered flowability, the MFR significantly decreased when the content of the fibrous filler was in a range of 50 mass % or higher relative to the amount of the base resin, and consequently, the flowability for normal molding conditions was not ensured.

From the evaluation results described above, according to the present disclosure, since the non-defibrated portion has the median fiber diameter of 5 µm or higher and 30 µm or lower in the fiber length direction of the fibrous filler while the defibrated fiber portions have the median fiber diameter of 0.1 µm or higher and 2 µm or lower, hydrophobization is promoted in the defibrated portions as compared to the non-defibrated portion, and the difference in hydrophobicity may significantly be formed in the fiber length direction of the fibrous filler, which produces the effect of facilitating straightening of the fibrous filler in the flow direction of the hydrophobic base resin. As a result, when the content of the fibrous filler is in a range of 10 mass % or higher and 80 mass % or lower relative to the amount of the base resin, the value of the MFR is 50% or higher and less than 100% as compared to the value of the MFR of the base resin, and therefore, it is found that the fiber compound resin composition capable of ensuring flowability for normal molding conditions may be provided.

The present disclosure an provide a fiber compound resin composition enhanced in both the high rigidity due to addition of the fibrous filler and the flowability to a metal mold etc. during melt molding. This resin composition may be used as an alternative for engineering plastics or as an alternative for metal materials. Therefore, the manufacturing costs of various industrial products or living goods made of engineering plastics or metal may greatly be reduced. Furthermore, the composition may be used for household electric appliance housings, building materials, and automobile members.

EXPLANATIONS OF LETTERS OR NUMERALS 1 base resin
2 fibrous filler
3 defibrated portion
4 non-defibrated portion

What is claimed is:

1. A fiber compound resin composition comprising:
   a base resin; and
   a fibrous filler contained in the base resin,
   wherein the fibrous filler comprises fibers with defibrated portions in end portions in a longitudinal direction and a non-defibrated portion in a central portion in the longitudinal direction,
   wherein the defibrated portions in the end portions have higher hydrophobicity than the non-defibrated portion in the central portion, and
   wherein the defibrated portions of the defibrated filler have a median fiber diameter of 0.1 µm or higher and 2 µm or lower, and wherein the non-defibrated portion of the fibrous filler has a median fiber diameter of 5 µm or higher and 30 µm or lower.

2. The fiber compound resin composition according to claim 1, wherein a range of the content of the fibrous filler from 10 mass % or higher to 80 mass % or lower when a total amount of the base resin and the fibrous filler is 100 mass %, a value of a melt mass flow rate of the resin composition defined by JIS K 7210 (corresponding standards: ISO 1133-1, 1133-2) is 50% or higher and less than 100% relative to a value of the melt mass flow rate of the base resin.

3. The fiber compound resin composition according to claim 1, wherein the fibrous filler is fibers made of natural fibers of cellulose.

4. The fiber compound resin composition according to claim 1, wherein the base resin is an olefin resin.

5. A method of manufacturing the fiber compound resin composition according to claim 1, comprising:
   preparing a base resin, a fibrous filler, and a dispersant having a hydrophobicity improving function; and
   performing a melt-kneading process of the fibrous filler together with the base resin and the dispersant having the hydrophobicity improving function.

* * * * *